United States Patent
Noujeim

(10) Patent No.: US 8,903,149 B1
(45) Date of Patent: Dec. 2, 2014

(54) SYSTEM AND METHOD OF COMMUNICATING INFORMATION ABOUT AN OBJECT CONCEALED BY A SCANNED SURFACE

(71) Applicant: Karam Noujeim, Los Altos, CA (US)

(72) Inventor: Karam Noujeim, Los Altos, CA (US)

(73) Assignee: Anritsu Company, Morgan Hill, CA (US)

( * ) Notice: Subject to any disclaimer, the term of this patent is extended or adjusted under 35 U.S.C. 154(b) by 120 days.

(21) Appl. No.: 13/745,390

(22) Filed: Jan. 18, 2013

(51) Int. Cl.
  *G06K 9/00* (2006.01)
  *G06K 9/78* (2006.01)
(52) U.S. Cl.
  CPC ........................ *G06K 9/78* (2013.01)
  USPC ........................ 382/128; 378/4; 250/370.09
(58) Field of Classification Search
  USPC ............... 382/100, 128, 129, 130, 131, 132; 128/922; 378/4–27; 250/271, 336.1, 250/339.06, 337.11, 370.09
  See application file for complete search history.

(56) References Cited

U.S. PATENT DOCUMENTS

| | | | | |
|---|---|---|---|---|
| 4,868,747 | A * | 9/1989 | Mori et al. | 382/131 |
| 5,365,565 | A * | 11/1994 | Barbaric | 378/146 |
| 6,021,229 | A * | 2/2000 | Takashima et al. | 382/285 |
| 6,583,793 | B1 * | 6/2003 | Gould et al. | 345/679 |
| 6,621,509 | B1 * | 9/2003 | Eiref et al. | 715/836 |
| 7,831,076 | B2 * | 11/2010 | Altmann et al. | 382/128 |
| 7,853,308 | B2 * | 12/2010 | Sauer et al. | 600/425 |
| 2008/0287803 | A1 * | 11/2008 | Li et al. | 600/466 |
| 2009/0088637 | A1 * | 4/2009 | Mikami | 600/443 |
| 2010/0039516 | A1 * | 2/2010 | Hollander et al. | 348/164 |
| 2011/0050848 | A1 * | 3/2011 | Rohaly et al. | 348/43 |
| 2011/0058723 | A1 * | 3/2011 | Jandt et al. | 382/131 |
| 2013/0044184 | A1 * | 2/2013 | Sophrin | 348/43 |
| 2013/0324875 | A1 * | 12/2013 | Mestha et al. | 600/534 |
| 2014/0063204 | A1 * | 3/2014 | Siercks | 348/50 |

* cited by examiner

*Primary Examiner* — Anand Bhatnagar
(74) *Attorney, Agent, or Firm* — Meyer IP Law Group

(57) ABSTRACT

A system for communicating information about one or both of an object with a scanned surface and an object at least partially concealed by the scanned surface comprises a scanner and a projector. The scanner is adapted to scan the surface to obtain information that is unattainable through visual observation. The projector is adapted to project an image related to the obtained information onto the scanned surface. The projected image is a dynamic image that is mapped in substantially real-time to a location on the scanned surface from or through which the information is obtained.

14 Claims, 5 Drawing Sheets

SYSTEM AND METHOD OF COMMUNICATING INFORMATION ABOUT AN OBJECT CONCEALED BY A SCANNED SURFACE

TECHNICAL FIELD

The present invention relates generally to systems and methods for detecting concealed features and objects and communicating information about the concealed features and objects.

BACKGROUND

Detecting the presence of concealed features and objects can be useful in a wide range of applications. Detection equipment is used, for example, in detecting the presence of weapons, diagnosing medical ailments and guiding surgery in patients, and identifying structural defects in buildings and infrastructure. In the case of weapon detection, detection equipment commonly includes metal detectors that generate audio cues that do not inform beyond the metallic nature of the detected object and the general location of the detected object. In high security settings such as airports, weapon detection equipment can include backscatter x-ray or millimeter wave scanners coupled to monitors for displaying images generated by the detection equipment, with the monitors often being viewed by security agents behind a desk. In the case of medical imaging, detection equipment is also commonly coupled to monitors for displaying images generated by the detection equipment, dividing the attention of a technician or a physician between the image displayed on the monitor and the patient. There is a need to improve the amount of information communicated by detection equipment and a need to improve the way in which that information is communicated to better inform and reduce the distraction of an individual receiving the information.

SUMMARY

In accordance with an embodiment of the invention, a system for communicating information about one or both of an object with a scanned surface and an object at least partially concealed by the scanned surface comprises a scanner and a projector. The scanner is adapted to scan the surface to obtain information that is unattainable through visual observation. The projector is adapted to project an image related to the obtained information onto the scanned surface. The projected image is a dynamic image that is mapped in substantially real-time to a location on the scanned surface from or through which the information is obtained.

In some embodiments of the present invention, the scanner is one of a microwave-based scanner and an x-ray-based scanner. For example, in some embodiments the scanner is a handheld millimeter wave scanner while in other embodiments the scanner is a backscatter x-ray scanner.

In some embodiments, the information obtained includes a shape of an object at least partially concealed by the scanned surface, and the projected image is a visual representation of the object. In other embodiments, the information obtained identifies a feature of the object with the scanned surface, and the projected image is an enhanced visual representation of the feature. For example, the enhanced visual representation of the feature can include an upscaled representation of the feature or a false color representation of the feature.

In accordance with a further embodiment of the invention, a method communicates information about one or both of an object with a scanned surface and an object at least partially concealed by the scanned surface. The method comprises scanning the surface of using a scanner adapted to obtain information that is unattainable through visual observation and projecting an image related to the obtained information onto the scanned surface using a projector. The projected image can be a dynamic image that is mapped in substantially real-time to a location on the scanned surface from or through which the information is obtained.

BRIEF DESCRIPTION OF THE DRAWINGS

Further details of embodiments of the present invention are explained with the help of the attached drawings in which.

DETAILED DESCRIPTION

Figure 1A:
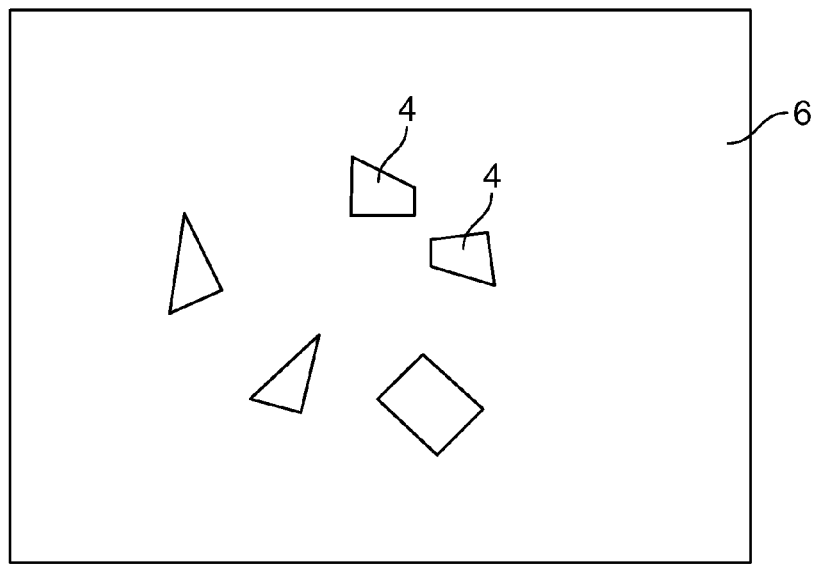
FIG. 1A is a photograph of objects on a first surface to be concealed behind a second surface.

The invention is illustrated by way of example and not by way of limitation in the figures of the accompanying drawings in which like references indicate similar elements, with the first numeral of a three numeral reference referring to the embodiment described. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Multiple different techniques can be applied to detect objects concealed by a scanned surface. For example, security at a performance venue can often employ hand-held metal detectors in the form of wands passed over a subject's outer clothing to detect metallic weapons such as guns and knives. When a metal object is detected an audio cue is given. The metal object may not be a weapon, but rather can include a belt buckle, key or wallet chain, etc. In the last decade, more sophisticated techniques have been employed for passenger and baggage screening at airports. Such techniques include backscatter x-ray scanners and passive and active millimeter wave scanners that fully scan the passenger to reveal features beneath the clothing of the passenger.

Recently, hand-held passive millimeter wave wands and scanners have become available including ALLCLEAR™ available from BRIJOT® Imaging Systems of Orlando, Fla., US and model EOD305 available from DSE International™ of Suffolk, UK. Hand-held passive millimeter wave wand and scanners are capable of detecting metals (ferrous and non-ferrous) and non-metals including plastics, liquids, gels, ceramics, powders, explosives, currency, drugs, media and electronics. ALLCLEAR™ uses a series of millimeter wave sensors arranged along a face of a wand. The natural millimeter waves emitted by a subject penetrate clothing and are detected by the sensors. Objects hidden under the clothing block the millimeter waves, preventing the waves from being detected by the sensors. A series of light emitting diodes (LEDs) are arranged along an opposite face of the wand corresponding to each sensor. When an item is detected, one or more LEDs along the wand corresponding to one or more sensors that do not receive millimeter waves are illuminated. Optionally, the wand can vibrate and emit audio cues upon item detection. However, the scanner does not generate, store, or display images of the object. Model EOD305 available from DSE International™ is a hand-held scanner that includes an integral screen. Model EOD305 also detects natural millimeter waves emitted by the subject, but generates a two-dimensional image that is displayed on the integral screen to identify objects beneath clothing that block the emission of the millimeter waves.

Figure 1B:
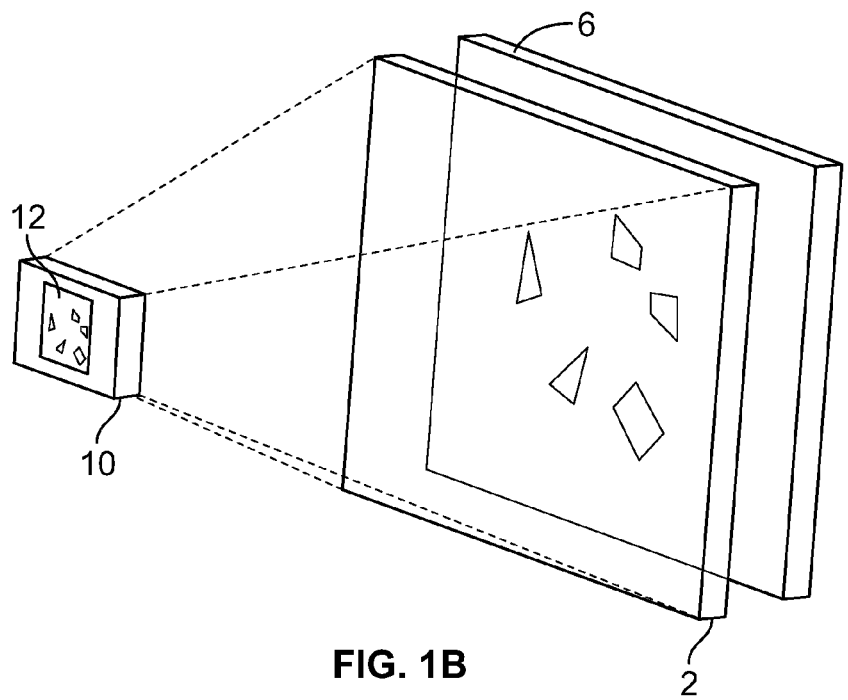
FIG. 1B illustrates a scanner for use in detecting an object concealed by a scanned surface.

Hand-held active millimeter wave scanners have been proposed, though are not currently commercially available. A microwave imaging technology has been described where large area diffraction limited images are created by a small, low cost, low power, handheld device. The device actively illuminates targets including targets behind walls and other flat surfaces with a circularly polarized scanning confocal spot beam. Backscattered radiation is collected to form an image on an LCD screen. See, Adams et al. "A Handheld Active Millimeter Wave Camera," 2010 IEEE International Conference on Technologies for Homeland Security (HST), 8-10 Nov. 2010, pp. 283-286. FIG. 1A is a photograph of objects 4 having different sizes and shapes positioned on a surface 6. FIG. 1B illustrates how an active scanner 10 might operate, with the scanner 10 detecting the objects 4 on the now-concealed surface 6 positioned behind an opaque, concealing surface 2. The scanner 10 displays a two-dimensional representation on a scanner screen 12. As will be appreciated, the size of the image on the scanner screen 12 is not true to scale, making it more difficult to discern. Further the location of the objects behind the concealing surface can only be approximated.

Figure 2:
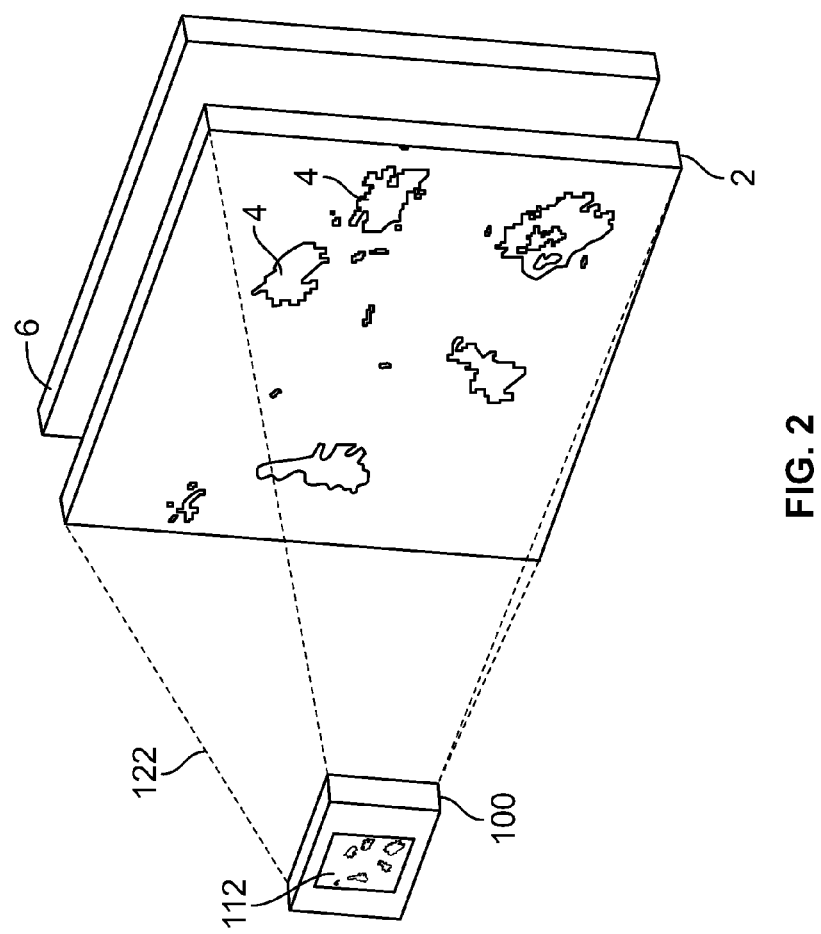
FIG. 2 illustrates an embodiment of a system in accordance with the present invention for communicating information about an object concealed by a scanned surface.

FIG. 2 illustrates an embodiment of a system in accordance with the present invention for communicating information about the objects 4 concealed by the scanned surface 2. As shown, the system includes a device 100 including a display screen 112. The device includes an active millimeter wave emitter and a sensor for detecting backscatter radiation. As with the previously described device of FIG. 1B, a two-dimensional representation is displayed on the display screen 12. The device 100 further comprises a projector on a face opposite the display screen projecting an image 122 based on the information collected by the sensor. The image 122 can be generated within the device 100 and projected in near real-time, with lag being limited to an ability of the device 100 to process information collected by the sensor and turn the processed information into an image. As can be seen, the generated image 122, projected onto the concealing surface 2 closely maps the detected object 4 positioned on the concealed surface 6 when projected onto the scanned surface 2.

Figure 3A:
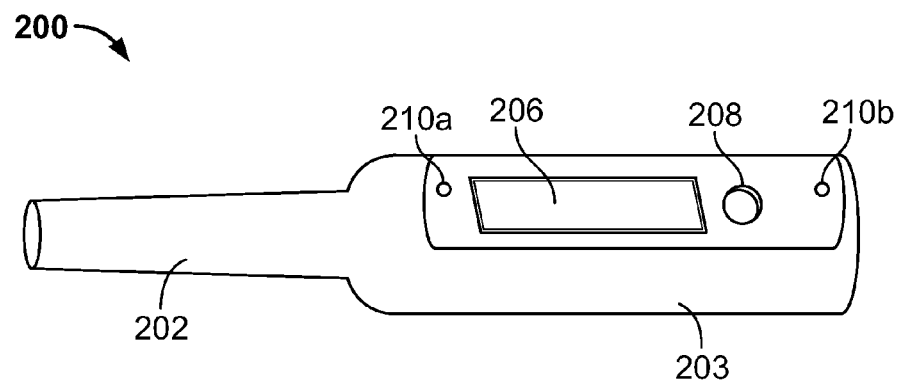
FIGS. 3A-3C illustrates an alternative embodiment of a system in accordance with the present invention for communicating information about an object concealed by a scanned surface.
Figure 3B:
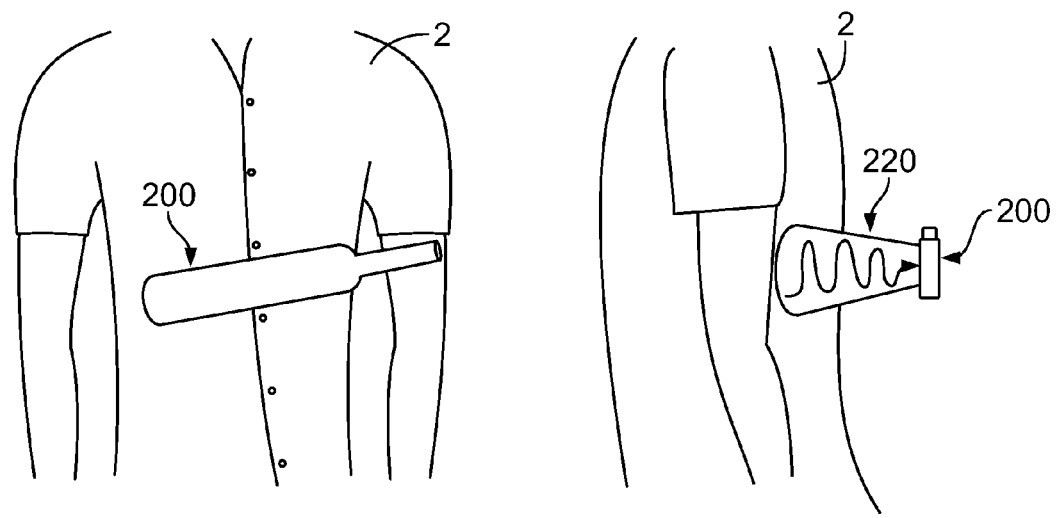
Figure 3C:
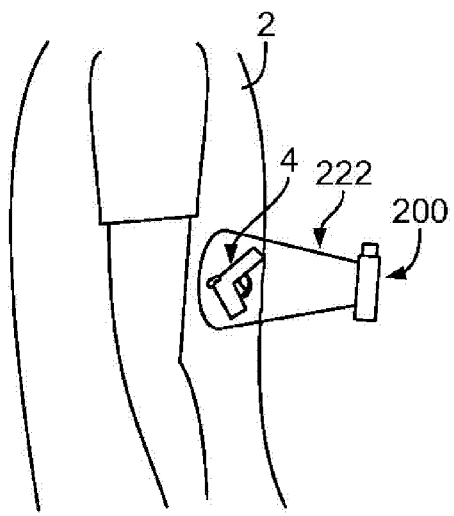

FIGS. 3A-3C illustrates an alternative embodiment of a system in accordance with the present invention for communicating information about an object concealed by a scanned surface. As shown, the system includes a hand-held device 200 including a wand 203 extending from a handle 202. A face of the wand 203 includes a millimeter wave sensor 206 for passively sensing naturally emitted millimeter waves 122. In alternative embodiments the wand can include an active microwave emitter and a sensor for detecting backscatter microwaves. The wand 203 and the millimeter wave sensor 206 can be sized as desired and as is deemed practical to comfortably wield the device 200 in hand. The larger the sensor 206, however, the more information can be collected by the sensor 206 at any given time. The device 200 further comprises a projector 208 arranged along a face of the wand 203 and projecting an image 222 based on the information collected by the sensor 206. The image 222 can be generated within the device 200 and projected in near real-time, with lag being limited to an ability of the device 200 to process information collected by the sensor 206 and turn the processed information into an image. In some embodiments, the wand 203 can further include one or more sensors for determining a distance of the wand 203 from a scanned surface 2. As shown, the wand 203 includes two laser sensors 210a, 210b—one at each end of the wand 203. The pair of sensors 210a, 210b allow the device 200 to compensate for being arranged at an angle relative the scanned surface 2, and to generate an image that more closely maps the detected object 4 when projected on the scanned surface 2.

For active microwave devices, a distance of the device from a detected object and the dimensions of the object can be determined based on a comparison of the emitted and reflected waves received by the microwave sensor, and therefore additional distance sensors can be unnecessary. Post-processing of the waveform of the reflected waves in the time-domain sense can allow for the precise calculation of distance from an object. For example, emitted microwaves can be swept in frequency to generate a set of reflection coefficients at various locations. The information can be transformed into an intensity plot representing reflections on the surface. The information can then be used to determine distance and dimensions. The information can be fed into a program to generate a projectable image so that the dimensions and the distances are truthful.

Current processing technology can allow an image to be generated and projected in very close to real-time such that the image is substantially superimposed over the object concealed by the scanned surfaced and blocking emitted millimeter waves. By projecting the image of the object onto the scanned surface security personnel can quickly ascertain a location and orientation of the object behind the scanned surface. Further, weapons can be more easily identified based on their shape. For example, handguns have distinctive shapes that can be readily discerned. Security personnel can quickly judge a situation based on this information and more quickly and appropriately decide on a course of action. Further, in some embodiments, a more complete image of the detected object can be communicated by projecting a larger, composite image that extends beyond the surface area of the sensor, providing a complete and useful idea of the nature and size of the object concealed. For example, information obtained from the sensor can be collected and persist within the device so that as security personnel make a first pass over the object, a second pass will display the entire object without the sensor necessarily detecting the entire object based on information obtained in the entire first pass. The larger image can provide a complete representation of the object rather than a partial representation, as would typically be available on a display screen.

While hand-held devices have been described above using passive and active millimeter wave techniques, embodiments in accordance with the present invention can apply to other currently available and future techniques for detecting objects concealed by scanned surfaces, such as magnetic imaging and backscatter x-ray scanning. One of ordinary art, upon reflecting on the teachings provided herein will appreciate the myriad different techniques for collecting information about objects concealed by a scanned surface.

Figure 4:
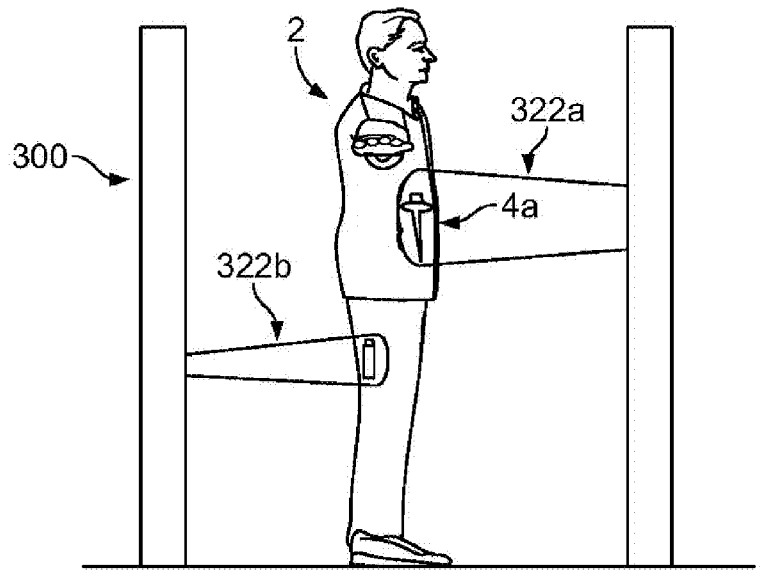
FIG. 4 illustrates an alternative embodiment of a system in accordance with the present invention for communicating information about an object concealed by a scanned surface.

Referring to FIG. 4, an alternative embodiment of a system 300 in accordance with the present invention for communicating information about an object concealed by a scanned surface is shown. The system 300 comprises a full-body scanner. The full-body scanner can apply, for example, backscatter x-ray scanning techniques or microwave scanning techniques, such as millimeter wave scanning. The full-body scanner can include a plurality of projectors for projecting images 322a, 322b of detected objects 4a, 4b onto a scanned surface 2. By projecting images onto the individual in the full-body scanner, security personnel can observe the subject directly and take action to control the subject when detected objects are spotted.

As shown, the full-body scanner can include one or more projectors on each of two walls opposite and parallel to one another. Projectors are shown at different vertical positions along the opposite walls. The projectors can be physically moved in a vertical direction, or alternatively multiple projectors can be used at different vertical positions. In other embodiments, a single, projector on each wall can be used to project images at different vertical elevations. An image generated to be projected on the scanned surface can be distorted so that when the image is superimposed over the scanned surface at the location of the object, the image compensates for the vertical position of the object and appears undistorted. In still other embodiments, a wide-angle projector can project a single image over the entire scanned surface. In still other embodiments, one or more projectors can be arranged on a wall of the body scanner that rotates around the subject during scanning, such as is commonly used in airport security backscatter x-ray machines, and can then further be rotated to arrange the one or more projectors to project the image at a target location behind which is concealed the object.

Figure 5:
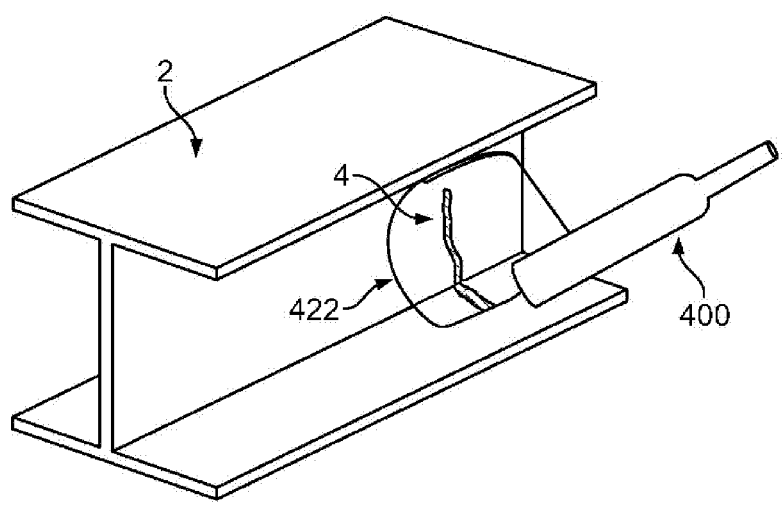
FIG. 5 illustrates an embodiment of a system in accordance with the present invention for communicating information about a feature of a scanned surface.

Embodiments in accordance with the present invention can also be applied to display features onto a scanned surface that are not visually observable. FIG. 5 illustrates an embodiment of a system 400 for communicating information about a defect in a building or infrastructure. As shown, a hand-held device uses scanning techniques to detect defects on or within a scanned surface 2 of an I-beam that are undetectable to the naked eye. Rather than superimpose an exact facsimile of the defect 4 onto the scanned surface 2, an image 422 of the defect 4 can be scaled in dimension to appear more visible, and/or given a false color representation to stand out against the scanned surface 2. An image 422 of the identified defect 4 can be modified and projected in any fashion that successfully communicates information about the defect that cannot be discerned visually. Further, descriptive information can be projected and displayed along side the superimposed representation. For example, text describing a depth of the defect can be projected alongside the representation, along with text describing the nature of the defect, such as stress, cracks, fatigue, corrosion, etc.

Figure 6:
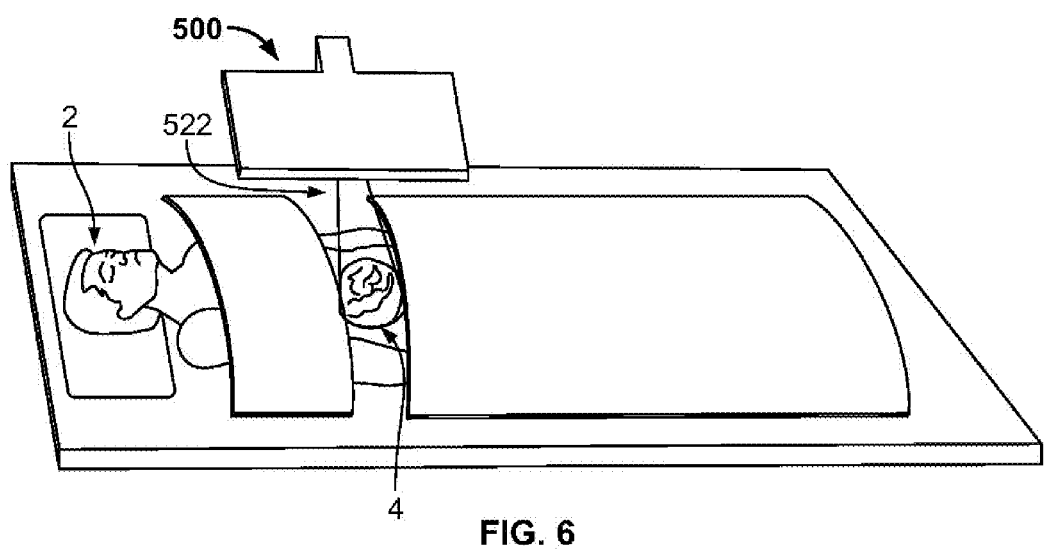
FIG. 6 illustrates an alternative embodiment of a system in accordance with the present invention for communicating information about the anatomy of a patient concealed by a scanned surface.

Referring to FIG. 6, in still other embodiments systems 500 in accordance with the present invention can be applied for communicating information about the anatomy of a patient 2, either during the diagnosis phase of treatment or for guiding surgeons during surgery. For example, as shown, a patient's abdomen 2 is being detected by a scanner 500, such as an active microwave scanner, and an image 522 of the organs beneath the skin is superimposed over the target site in real time. A physician performing an appendectomy can quickly determine the exact location of the appendix, assisting the surgeon in minimizing an incision made by the surgeon for inserting the appropriate equipment for separating the appendix from the large intestine and extracting the appendix.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been presented for purposes of illustration and description. It is not intended to be exhaustive or to limit the invention to the precise forms disclosed. Many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A system for communicating information about one or both of an object with a scanned surface and an object at least partially concealed by the scanned surface, comprising:
   a scanner adapted to scan the surface to obtain information that is unattainable through visual observation;
   a projector adapted to project an image related to the obtained information onto the scanned surface; and
   wherein the projected image is a dynamic image that is mapped in substantially real-time to a location on the scanned surface from or through which the information is obtained.

2. The system of claim 1, wherein the scanner is one of a microwave-based scanner and an x-ray-based scanner.

3. The system of claim 2, wherein the scanner is a handheld millimeter wave scanner.

4. The system of claim 2, wherein the scanner is a backscatter x-ray scanner.

5. The system of claim 1, wherein
   the information obtained identifies a feature of the object with the scanned surface, and the projected image is an enhanced visual representation of the feature.

6. The system of claim 5, wherein the enhanced visual representation of the feature is one or both of upscaled in size and falsely colored.

7. The system of claim 1, wherein
the information obtained includes a shape of an object at least partially concealed by the scanned surface, and
the projected image is a visual representation of the object.

8. A method for communicating information about one or both of an object with a scanned surface and an object at least partially concealed by the scanned surface, comprising:
scanning the surface of using a scanner adapted to obtain information that is unattainable through visual observation;
projecting an image related to the obtained information onto the scanned surface using a projector; and
wherein the projected image is a dynamic image that is mapped in substantially real-time to a location on the scanned surface from or through which the information is obtained.

9. The method of claim 8, wherein the scanner is one of a microwave-based scanner and an x-ray-based scanner.

10. The method of claim 9, wherein the scanner is a hand-held millimeter wave scanner.

11. The method of claim 9, wherein the scanner is a back-scatter x-ray scanner.

12. The method of claim 8, wherein
the information obtained identifies a feature of the object with the scanned surface, and
the projected image is an enhanced visual representation of the feature.

13. The method of claim 12, wherein the enhanced visual representation of the feature is one or both of upscaled in size and falsely colored.

14. The method of claim 8, wherein
the information obtained includes a shape of an object at least partially concealed by the scanned surface, and
the projected image is a visual representation of the object.

* * * * *